United States Patent [19]

Watson

[11] Patent Number: 5,426,512
[45] Date of Patent: Jun. 20, 1995

[54] IMAGE DATA COMPRESSION HAVING MINIMUM PERCEPTUAL ERROR

[75] Inventor: Andrew B. Watson, Los Gatos, Calif.

[73] Assignee: The United States of America as represented by the Administrator of the National Aeronautics and Space Administration, Washington, D.C.

[21] Appl. No.: 186,366

[22] Filed: Jan. 25, 1994

[51] Int. Cl.6 ........................ H04N 1/41; H04N 1/415; G06K 9/36

[52] U.S. Cl. .................................... 358/426; 358/432; 358/433; 382/232

[58] Field of Search ............... 358/426, 432, 433, 429; 382/56

[56] References Cited

U.S. PATENT DOCUMENTS

| | | | |
|---|---|---|---|
| 4,386,366 | 5/1983 | Mori | 358/135 |
| 4,776,030 | 10/1988 | Tzou | 382/56 |
| 4,780,761 | 10/1988 | Daly et al. | 358/133 |
| 4,783,841 | 11/1988 | Crayson | 382/56 |
| 4,831,636 | 5/1989 | Taniguchi et al. | 375/27 |
| 4,920,426 | 4/1990 | Hatori et al. | 358/433 |
| 5,101,280 | 5/1992 | Moronaga et al. | 358/426 |
| 5,121,216 | 6/1992 | Chen et al. | 358/261.3 |
| 5,170,264 | 12/1992 | Saito et al. | 358/433 |

OTHER PUBLICATIONS

"Luminance-Model-Based DCT Quantization for Color Image Compression" of A. J. Ahumada et al, published in 1992 in Human Vision, Visual Processing, and Digital Display III Proc. SPIE 1666, paper 32.

"An Improved Detection Model for DCT Coefficient Quantization" of H. A. Peterson et al, published in 1993 in Human Vision, Visual Processing and Digital Display VI SPIE vol. 1913, pp. 191-201.

"DCT Quantization Matrices Visually Optimized for Individual Images" of A. B. Watson, published no earlier than Feb. 1993 in Human Vision, Visual Processing and Digital IV, Proc. 1913-14.

Primary Examiner—Edward L. Coles, Sr.
Assistant Examiner—Allan A. Esposo
Attorney, Agent, or Firm—Kenneth L. Warsh; Guy M. Miller; John G. Mannix

[57] ABSTRACT

A method for performing image compression that eliminates redundant and invisible image components. The image compression uses a Discrete Cosine Transform (DCT) and each DCT coefficient yielded by the transform is quantized by an entry in a quantization matrix which determines the perceived image quality and the bit rate of the image being compressed. The present invention adapts or customizes the quantization matrix to the image being compressed. The quantization matrix comprises visual masking by luminance and contrast techniques and by an error pooling technique all resulting in a minimum perceptual error for any given bit rate, or minimum bit rate for a given perceptual error.

10 Claims, 6 Drawing Sheets

IMAGE DATA COMPRESSION HAVING MINIMUM PERCEPTUAL ERROR

ORIGIN OF THE DISCLOSURE

The invention described herein was made by an employee of the National Aeronautics and Space Administration and it may be manufactured and used by and for the United States Government for governmental purposes without the payment of royalties thereon or therefore.

BACKGROUND OF THE INVENTION

A. Technical Field of Field of the Invention:

The present invention relates to an apparatus and method for coding images, and more particularly, to an apparatus and method for compressing images to a reduced number of bits by employing a Discrete Cosine Transform (DCT) in combination with visual masking including luminance and contrast techniques as well as error pooling techniques all to yield a quantization matrix optimizer that provides an image having a minimum perceptual error for a given bit rate, or a minimum bit rate for a given perceptual error.

B. Description of the Prior Art:

Considerable research has been conducted in the field of data compression, especially the compression of digital information of digital images. Digital images comprise a rapidly growing segment of the digital information stored and communicated by science, commerce, industry and government. Digital images transmission has gained significant importance in highly advanced television systems, such as high definition television using digital information. Because a relatively large number of digital bits are required to represent digital images, a difficult burden is placed on the infrastructure of the computer communication networks involved with the creation, transmission and re-creation of digital images. For this reason, there is a need to compress digital images to a smaller number of bits, by reducing redundancy and invisible image components of the images themselves.

A system that performs image compression is disclosed in U.S. Pat. No. 5,121,216 of C.E. Chen et al, issued Jun. 9, 1992, and herein incorporated by reference. The '216 patent discloses a transform coding algorithm for a still image, wherein the image is divided into small blocks of pixels. For example, each block of pixels may be either an 8×8 or 16×16 block. Each block of pixels then undergoes a two dimensional transform to produce a two dimensional array of transform coefficients. For still image coding applications, a Discrete Cosine Transform (DCT) is utilized to provide the orthogonal transform.

In addition to the '216 patent, the Discreet Cosine Transform is also employed in a number of current and future international standards, concerned with digital image compression, commonly referred to as JPEG and MPEG, which are acronyms for Joint Photographic Experts Group and Movie Pictures Experts Group, respectively. After a block of pixels of the '216 patent undergoes a Discrete Cosine Transform (DCT), the resulting transform coefficients are subject to compression by thresholding and quantization operations. Thresholding involves setting all coefficients whose magnitude is smaller than a threshold value equal to zero, whereas quantization involves scaling a coefficient by step size and rounding off to the nearest integer.

Commonly, the quantization of each DCT coefficient is determined by an entry in a quantization matrix. It is this matrix that is primarily responsible for the perceived image quality and the bit rate of the transmission of the image. The perceived image quality is important because the human visual system can tolerate a certain amount of degradation of an image without being alerted to a noticeable error. Therefore, certain images can be transmitted at a low bit rate, whereas other images cannot tolerate any degradation and should be transmitted at a higher bit rate in order to preserve their informational content.

The '216 patent discloses a method for the compression of image information based on human visual sensitivity to quantization errors. In the method of '216 patent, there is a quantization characteristic associated with block to block components of an image. This quantization characteristic is based on a busyness measurement of the image. The method of '216 patent does not compute a complete quantization matrix, but rather only a single scaler quantizer.

Two other methods are available for computing DCT quantization matrices based on human sensitivity. One is based on a mathematical formula for human contrast sensitivity function, scaled for viewing distance and display resolution, and is disclosed in U.S. Pat. No. 4,780,716 of S.J. Daly et al. The second is based on a formula for the visibility of individual DCT basic functions, as a function of viewing distance, display resolution, and display luminance. The second formula is disclosed in both a first article entitled "Luminance-Model-Based DCT Quantization For Color Image Compression" of A.J. Ahumada et al. published in 1992 in the *Human Vision, Visual Processing, and Digital Display III* Proc. SPIE 1666, Paper 32, and a second technical article entitled "An Improved Detection Model for DCT Coefficient Quantization" of H.A. Peterson, et al., published in 1993, in *Human Vision, Visual Processing and Digital Display VI* Proc. SPIE. Vol. 1913 pages 191–201. The methods described in the '761 patent and the two technical articles do not adapt the quantization matrix to the image being compressed, and do not therefore take advantage of masking techniques for quantization errors that utilize the image itself. Each of these techniques has features and benefits described below.

First, visual thresholds increase with background luminance and this feature should be advantageously utilized. However, the formula given in the both referenced technical articles describes the threshold for DCT basic functions as a function of mean luminance. This would normally be taken as the mean luminance of the display. However, variations in local mean luminance within the image will in fact produce substantial variations in the DCT threshold quantities. These variations are referred to herein as "luminance masking" and should be fully taken into account.

Second, threshold for a visual pattern is typically reduced in the presence of other patterns, particularly those of similar spatial frequency and orientation. This reduction phenomenon is usually called "contrast masking." This means that a threshold error in a particular DCT coefficient in a particular block of the image will be a function of the value of that coefficient in the original image. The knowledge of this function should be taken advantage of in order to compress the image while not reducing the quality of the compressed image.

Third, the method disclosed in the two referenced technical articles ensures that a single error is below a predetermined threshold. However, in a typical image there are many errors of varying magnitudes that are not properly handled by a single threshold quantity. The visibility of this error ensemble selected to handle all varying magnitudes is not generally equal to the visibility of the largest error, but rather reflects a pooling of errors over both frequencies and blocks of the image. This pooling is herein term "error pooling" and is beneficial in compressing the digital information of the image while not degrading the quality of the image.

Fourth, when all errors are kept below a perceptual threshold, a certain bit rate will result, but at times it may be desired to have an even lower bit rate. The two referenced technical articles do not disclose any method that would yield a minimum perceptual error for a given bit rate, or a minimum bit rate for a given perceptual error. It is desired that such a method be provided to accommodate this need.

Finally, it is desired that all of the above prior art limitations and drawbacks be eliminated so that a digital image may be represented by a reduced number of digital bits while at the same time providing an image having a low perceptual error.

Accordingly, an object of the present invention is to provide a method to compress digital information yet provide a visually optimized image.

Another object of the present invention is to provide a method of compressing a visual image based on luminance masking, contrast masking, and error pooling techniques.

A further object of the present invention is to provide a quantization matrix that is adapted to the individual image being compressed so that the image that is reproduced has a high resolution and a low perceptual error.

A still further object of the present invention is to provide a method that yields minimal perceptual error of an image for a given bit rate, or a minimum bit rate for a given perceptual error of the image.

SUMMARY OF THE INVENTION

The invention is directed to digital compression of images, comprising a plurality of blocks of pixels, that uses the DCT transform coefficients yielded from a Discrete Cosine Transform (DCT) of all the blocks as well as other display and perceptual parameters all to generate a quantization matrix which, in turn, yields a reproduced image having a low perceptual error. The invention adapts or customizes the individual quantization matrix to the image being compressed.

The present invention transforms a block of pixels from an electronic image into a digital representation of that image and comprises the steps of applying a Discrete Cosine Transform (DCT), selecting a DCT mask ($m_{ijk}$) for each block of pixels, and selecting a quantization matrix ($q_{ij}$) for quantizing DCT transformation coefficients ($c_{ijk}$) produced by the DCT transformation. The application of a Discrete Cosine Transform (DCT) transforms the block of pixels into a digital signal represented by the DCT coefficients ($c_{ijk}$). The DCT mask is based on parameters comprising DCT coefficients ($c_{ijk}$), and display parameters. The selection of the quantization matrix ($q_{ij}$) comprises the steps of: (i) selecting an initial value of $q_{ij}$; (ii) quantizing the DCT coefficient $q_{ij}$ in each block k to form quantized coefficient $u_{ijk}$; (iii) inverse quantizing $u_{ijk}$ by multiplying by $q_{ij}$; (iv) subtracting the reconstructed coefficient $q_{ij}U_{ijk}$ from $c_{ijk}$ to compute the quantization error $e_{ijk}$, (v) dividing $e_{ijk}$ by the DCT mask $m_{ijk}$ to obtain perceptual errors; (vi) pooling the perceptual errors of one frequency $ij$ over all blocks k to obtain an entry in a perceptual error matrix $p_{ij}$; and (vii) repeating this process (i–vi) for each frequency $ij$, and (viii) adjusting the values of $q_{ij}$ up or down until each entry in the perceptual error matrix $P_{ij}$ is within a target range.

The method preferably comprises a further step of entropy coding the digital representation of the image. In addition, the invention further comprises providing a computer network for implementing the practice of the present invention.

DETAILED DESCRIPTION OF THE INVENTION

Figure 1:
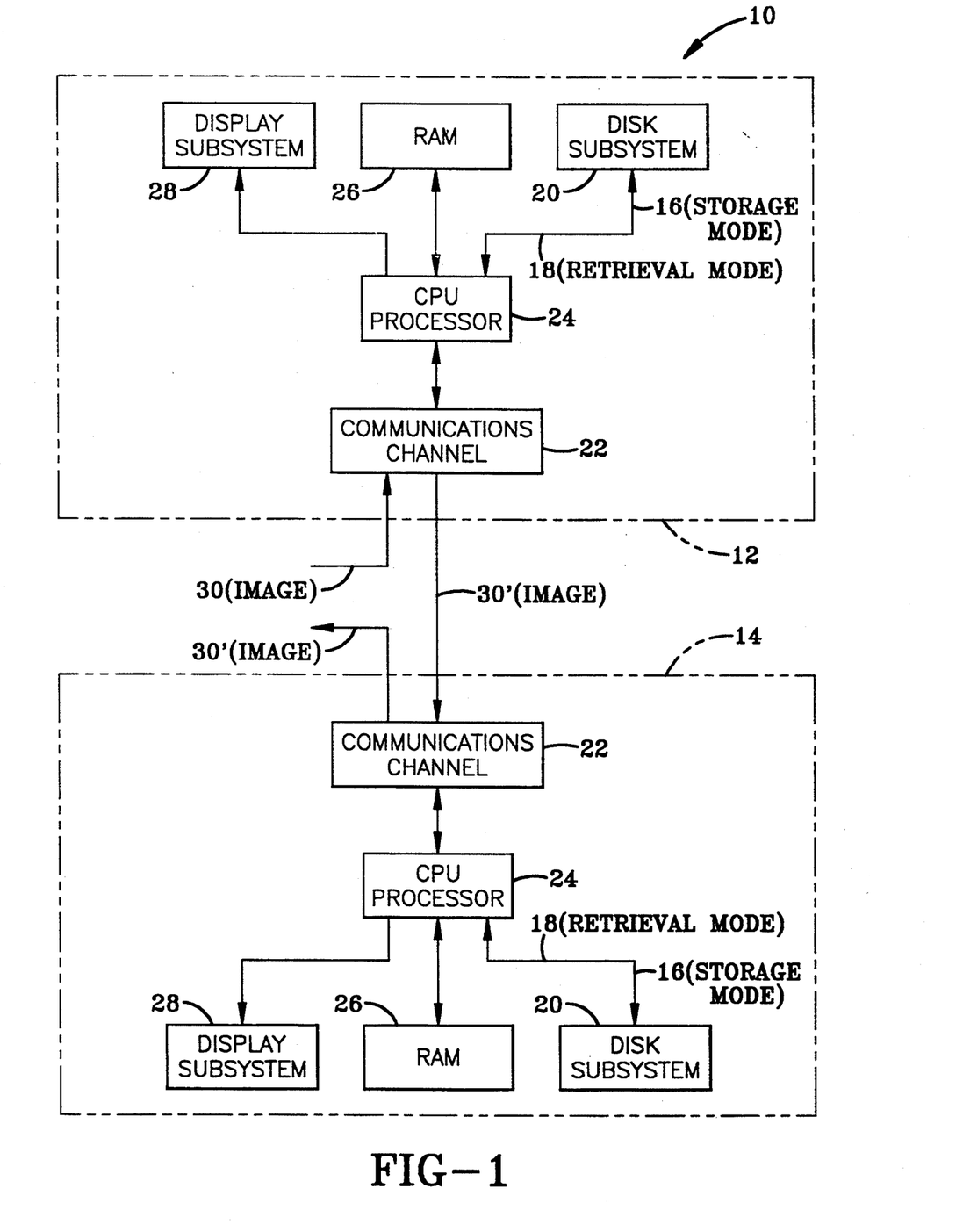
FIG. 1 is a block diagram of a computer network that may be used in the practice of the present invention.

Referring now to the drawings wherein like reference numerals designate like elements, there is shown in FIG. 1 a block diagram of a computer network 10 that may be used in the practice or the present invention. The network 10 is particularly suited for performing the method of the present invention related to a still image that may be stored, retrieved or transmitted. For the embodiment shown in FIG. 1, a first group of channelized equipment 12 and a second group of channelized equipment 14 are provided. Further, as will be further described, for the embodiment shown in FIG. 1, the channelized equipment 12 is used to perform the storage mode 16/retrieval mode 18 operations of the network 10 and, similarly, the channelized equipment 14 is used to perform the storage mode 16/retrieval mode 18 operations of the network 10. As will be further described, the storage mode 16 is shown as accessing each disk subsystem 20, whereas the retrieval mode 18 is shown as recovering information from each disk subsystem 20. Each of the channelized equipments 12 and 14 may be a SUN SPARC computer station whose operation is disclosed in instruction manual Sun Microsystems Part #800-5701-10. Each of the channelized equipments 12 and 14 is comprised of elements having the reference numbers given in Table 1.

TABLE 1

| Reference No. | Element |
| --- | --- |
| 20 | Disk Subsystem |
| 22 | Communication Channel |

TABLE 1-continued

| Reference No. | Element |
| --- | --- |
| 24 | CPU Processor |
| 26 | Random Access Memory (RAM) |
| 28 | Display Subsystem |

In general, and as to be more fully described, the method of the present invention, being run in the network 10, utilizes, in part, a Discrete Cosine Transform (DCT), discussed in the "Background" section, to accomplish image compression. In the storage mode 16, an original image 30, represented by a plurality of digital bits, is received from a scanner or other source at the communication channel 22 of the channelized equipment 12. The image 30 is treated as a digital file containing pixel data. The channelized equipment 12, in particular the CPU processor 24, performs a DCT transformation, computes a DCT mask and iteratively estimates a quantization matrix optimizer. The channelized equipment 12 then quantizes the digital bits comprising the image 30, and performs run-length encoding and Huffman or arithmetic coding of the quantized DCT coefficients. Run-length encoding, arithmetic coding and Huffman coding are well-known and reference may be respectively made to the discussion of reference numbers 24 and 28 of U.S. Pat. No. 5,170,264, herein incorporated by reference, for a further discussion thereof. The optimized quantization matrix is then stored in coded form along with coded coefficient data, following a JPEG or other standard. The compressed file is then stored on the disk subsystem 20 of the channelized equipment 12.

In the retrieval mode 18, the channelized equipment 12 (or 14) retrieves the compressed file from the disk subsystem 20, and decodes the quantization matrix and the DCT coefficient data. The channelized equipment 12, or the channelized equipment 14 to be described, then de-quantizes the coefficients by multiplication of the quantization matrix and performs an inverse DCT. The resulting digital file containing pixel data is available for display on the display subsystem 28 of the channelized equipment 12 or can be transmitted to the channelized equipment 14 or elsewhere by the communication channel 22. The resulting digital file is shown in FIG. 1 as 30' (IMAGE). The operation of the present invention may be further described with reference to FIG. 2.

Figure 2:
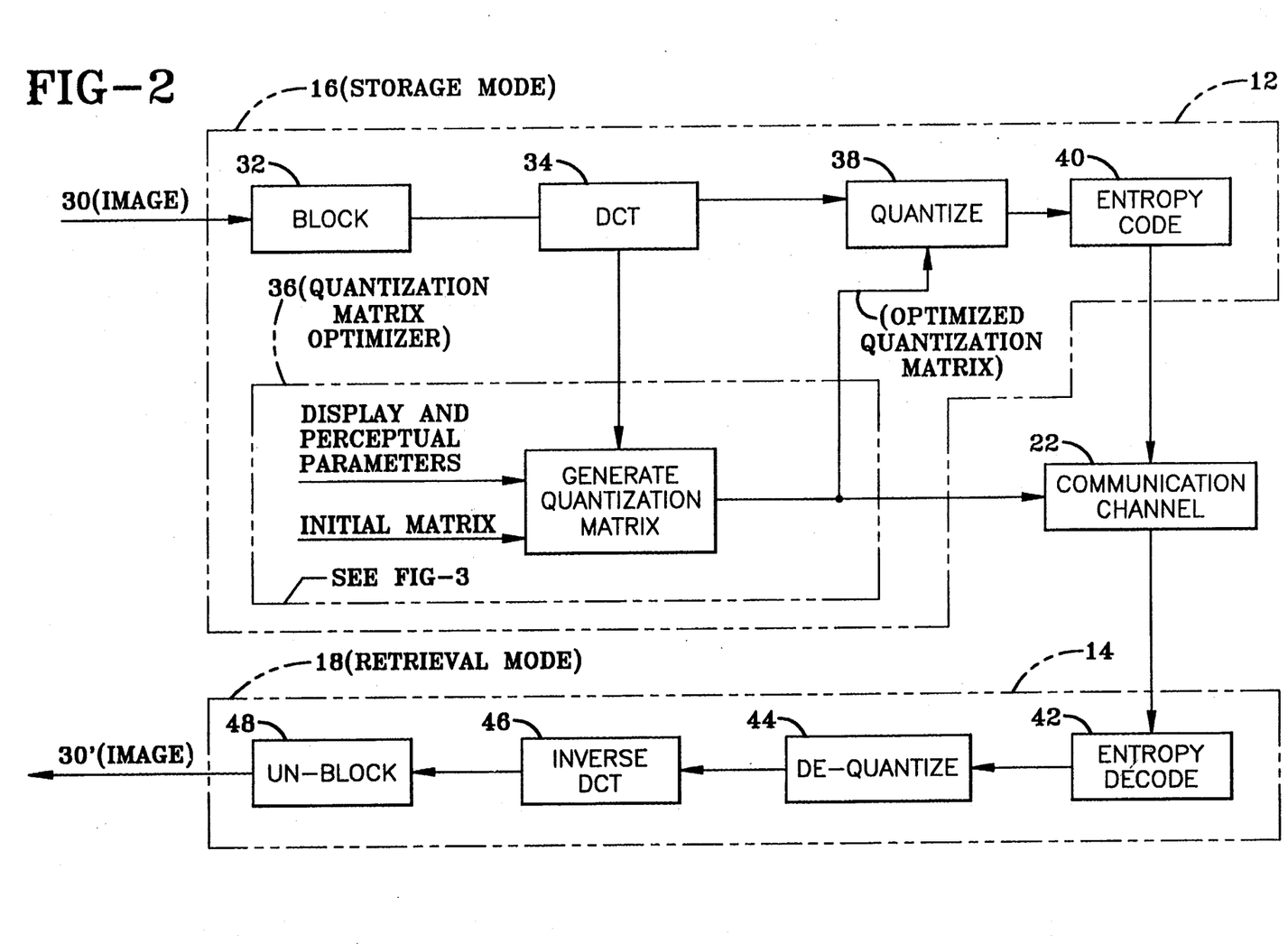
FIG. 2 schematically illustrates some of the steps involved with the method of the present invention.

FIG. 2 is primarily segmented to illustrate the storage mode 16 and the retrieval mode 18. FIG. 2 illustrates that the storage mode 16 is accomplished in channelized equipment, such as channelized equipment 12, and the retrieval mode is accomplished in the same or another channelized equipment, such as channelized equipment 14. The channelized equipments 12 and 14 are interfaced to each other by the communication channel 22. The image 30 being compressed by the operation of the present invention comprises a two-dimensional array of pixels, e.g., 256×256 pixels. This array of pixels is composed of contiguous blocks; e.g., 8×8 blocks, of pixels representatively shown in segment 32. The storage mode 16 is segmented into the following steps: block 32, DCT 34, initial matrix, quantization matrix optimizer 36, quantize 38, and entropy code 40. The retrieval mode 18 is segmented into the following steps: entropy decode 42, de-quantize 44, inverse DCT 46, and unblock 48. The steps shown in FIG. 2 (to be further discussed with reference to FIG. 3) are associated with the image compression of the present invention and, in order to more clearly describe such compression, reference is first made to the quantities listed in the Table 2 having a general definition given therein.

TABLE 2

| Quantities | General Definition |
| --- | --- |
| i, j | indexes of the DCT frequency (or basis function) |
| k | index of a block of the image |
| $c_{ijk}$ | DCT coefficients of an image |
| $q_{ij}$ | quantization matrix |
| $u_{ijk}$ | quantized DCT coefficients |
| $e_{ijk}$ | DCT error |
| $t_{ij}$ | DCT threshold matrix (based on global mean luminance) |
| apw [i, j, L, px, py ... ] | threshold formula of Peterson et al. given in the article Human Vision, Visual Processing and Digital Display VI (previously cited) |
| $t_{ijk}$ | DCT threshold matrix (based on local mean luminance $c_{00k}$) |
| $a_t$ | luminance masking exponent |
| $w_{ij}$ | contrast masking exponent (Weber exponent) |
| $m_{ijk}$ | DCT Mask |
| $d_{ijk}$ | perceptual error in a particular frequency i, j and block k |
| $p_{ij}$ | perceptual error matrix |
| $\beta_s$ | spatial error-pooling |
| $c_{00k}$ | DC coefficient in block k |
| $L_0$ | mean luminance of the display |
| $c_{00}$ | Average DC coefficient, corresponding to $L_0$ (typically 1024) |
| $\psi$ | target total perceptual error value |

Each block (step 32) of the pixels is subjected to the application of a Discrete Cosine Transform (DCT) (step 34) yielding related DCT coefficients. The two-dimensional Discrete Cosine Transform (DCT) is well known and may be such as described in the previously incorporated by reference U.S. Pat. No. 5,121,216. The coefficients of the DCT, herein termed $c_{ijk}$, obtained by the Discrete Cosine Transform (DCT) of each block of pixels comprise DC and AC components. The DC coefficient is herein termed $c_{00k}$ (0,0) which represents the average intensity of the block. The remainder of the coefficients $c_{ijk}$ are termed AC coefficients (0,1),(1,0) .. . (ij).

The DCT (step 34) of all blocks (step 32), along with the display and perceptual parameters (to be described) and an initial matrix, are all inputted into a quantization matrix optimizer 36, which is a process that creates an optimized quantization matrix which is used to quantize (step 38) the DCT coefficients. The optimized quantization matrix is also transferred, by the communication channel 22 of the channelized equipment 12, for its use in the retrieval mode 18 that is accomplished in the channelized equipment 14. The quantized DCT coefficients ($c_{ijk}$) are entropy coded (step 40) and then sent to the communication channel 22. Entropy coding is well-known in the communication art and is a technique wherein the amount of information in a message is based on $\log_n$, where n is the number of possible equivalent messages contained in such information.

At the receiving channelized equipment 14, an inverse process occurs to reconstruct the original block of pixels thus, the received bit stream of digital information containing quantized DCT coefficients $c_{ijk}$ is entropy decoded (step 42) and then are de-quantized (step 44), such as by multiplying by the quantization step size $q_{ij}$ to be described. An inverse transform, such as an inverse Discrete Cosine Transform (DCT), is then applied to the DCT coefficients ($c_{ijk}$) to reconstruct the block of pixels. After the reconstruction, the block of pixels are unblocked so as to provide a reconstituted and reconstructed image 30'. The quantization matrix optimizer 36 is of particular importance to the present invention and may be described with reference to FIG. 3.

Figure 3:
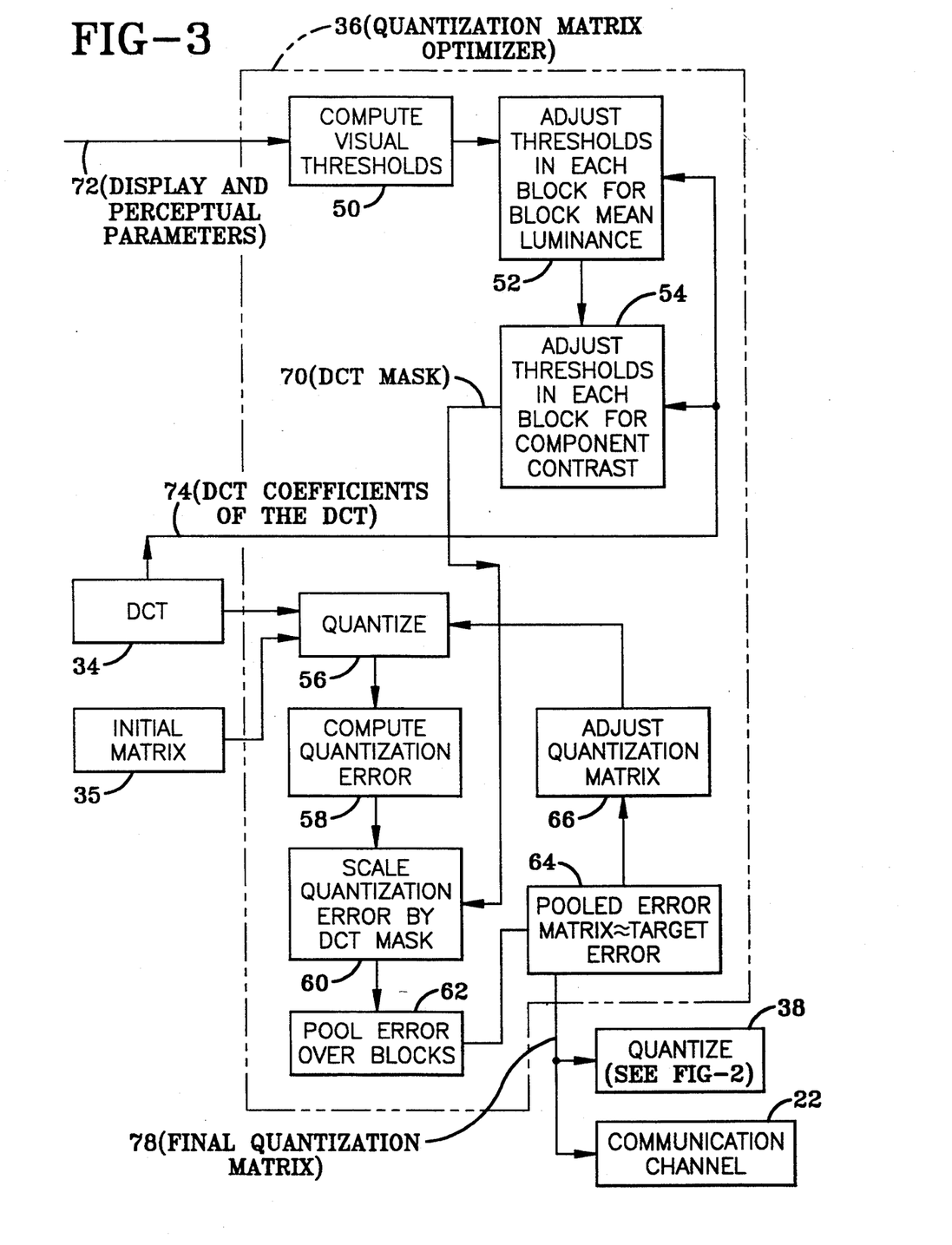
FIG. 3 schematically illustrates the steps involved, in one embodiment, with the formation of the quantization matrix optimizer of the present invention.

The quantization optimizer matrix 36 is adapted to the particular image being compressed and, as will be further described, advantageously includes the functions of luminance masking, contrast masking, error pooling and selectable quality. All of which functions cooperate to yield a compressed image having a minimal perceptual error for a given bit rate, or minimum bit rate for a given perceptual error. The quantization matrix optimizer 36, in one embodiment, comprises a plurality of processing segments each having a reference number and nomenclature given in Table 3.

TABLE 3

| Processing Segment | Nomenclature |
| --- | --- |
| 50 | Compute visual thresholds |
| 52 | Adjust thresholds in each block for block mean luminance |
| 54 | Adjust thresholds in each block for component contrast |
| 56 | Quantize |
| 58 | Compute quantization error |
| 60 | Scale quantization error by DCT mask |
| 62 | Pool error over blocks |
| 64 | Pooled error matrix is approximate target error |
| 66 | Adjust quantization matrix |

The first step in the generation of the quantization optimizer matrix 36 is the derivation of a function DCT mask 70 which is accomplished by the operation of processing segments 50, 52 and 54 and is determined, in part, by the display and perceptual parameters 72 having typical values given in the below Table 4.

TABLE 4

| Display and Perceptual Parameters | Typical Values |
| --- | --- |
| $a_t$ | 0.649 |
| $\beta_s$ | 4 |
| $w_{ij}$ | 0.7 |
| $L_0$ | 65 cd/m$^2$ |
| image grey levels | 256 |
| $c_{00}$ | 1024 |
| viewing distance | assumed to yield 32 pixels/degree, and for a 256 by 256 pixel image, this corresponds to a viewing distance of 7.115 picture heights |

The display and perceptual parameters 72 are used to compute a matrix of DCT component visual thresholds by using the formula more fully described in the previously referenced first and second technical articles and which formula may be represented by expression 1:

$$t_{ij} = apw[i,j,L,px,py,\ldots]$$

where apw represents the threshold formula of Table 2, i and j are indexes of the DCT frequency, px represents pixels per degree of visual angle horizontal and py represents pixels per degree of visual angle vertical.

The visual thresholds values of expression (1) are then adjusted for mean block luminance in processing segment 52. The processing segment 52 receives only the DC coefficient of the DCT coefficients indicated by reference number 74, whereas segment 54 receives and uses the entire DCT coefficients. The formula used to accomplish processing segment 52 is given by expression 2:

$$t_{ijk} = t_{ij}(C_{00k}/\overline{c_{00}})^{a_t}$$

where $a_t$ is a luminance-masking exponent having a typical value of 0.65, $t_{ijk}$ is the adjusted threshold, $t_{ij}$ is the un-adjusted threshold, $c_{00}$ is the average of the DC terms of the DC coefficients for the present image, or may be simply a nominal value of 1024, for an eight (8) bit image, and $c_{00k}$, is the DC term of the DCT for block k.

As seen in FIG. 3, the luminance-adjusted thresholds of segment 52 are then adjusted for component contrast by the operation of a routine having a relationship as given by the below expression 3:

$$m_{ijk} = \text{Max}[t_{ijk}, |c_{ijk}|^{w_{ij}} t_{ijk}^{1-w_{ij}}]$$

where $m_{ijk}$ is the contrast-adjusted threshold, $c_{ijk}$ is the DCT coefficient, $t_{ijk}$ is the corresponding threshold of expression 2, and $w_{ij}$ is the exponent that lies between 0 and 1 and typically has a value of 0.7. Because the exponent $w_{ij}$ may differ for different frequencies of the DCT coefficients $c_{ijk}$, a matrix of exponents equal in size to the quantization matrix optimizer 36 may be provided for the derivation of $w_{ij}$. The result of the operations of processing segments 50, 52, and 54 is the derivation of the quantity $m_{ijk}$ herein termed "DCT mask" 70 which is supplied to the processing segment 60 to be described hereinafter.

After the calculation of the DCT mask 70 has been determined, an iterative process of estimating the quantization matrix optimizer 36 begins and is comprised of processing segments 56, 58, 60, 62, 64, and 66. The initial matrix 35, which is typically fixed and which may be any proper quantization matrix, is typically set to a maximum permissible quantization matrix entry (e.g., in the JPEG standard this maximum value is equal to 255) and is used in the quantization of the image as indicated in processing segment 56.

Each transformed block of the image contained in the initial matrix 35 is then quantized in segments 56 by dividing it, coefficient by coefficient, by the quantization matrix ($q_{ij}$), and is rounded to the nearest integer as shown in expression 4:

$$u_{ijk} = \text{Round}[c_{ijk}/q_{ij}]$$

Segment 58 then computes the quantization error $e_{ijk}$ in the DCT domain, which is equal to the difference between the de-quantized and un-quantized DCT coefficients $c_{ijk}$, and is shown by expression 5:

$$e_{ijk} = c_{ijk} - u_{ijk} q_{ij}$$

From expressions 4 and 5, it may be shown that the maximum possible quantization error $e_{ijk}$ is $q_{ij}/2$.

The output of segment 58 is then applied to segment 60, wherein the quantization error is scaled (divided) by the value of the DCT mask 70. This scaling is described by expression 6:

$$d_{ijk} = e_{ijk}/m_{ijk}$$

where $d_{ijk}$ is defined as the perceptual error at frequency ij in block k. The scaled quantization error is then applied to the processing segment 62. The processing segment 62 causes all the scaled errors to be pooled over all of the blocks, separately for each DCT frequency (ij). The term "error pooling" is meant to represent that the errors are combined over all of the DCT coefficients rather than having one relatively large error in one DCT coefficient dominating the other errors in the remaining DCT coefficients. The pooling is accomplish by a routine having a relationship of expression 7:

$$p_{ij} = \left( \sum_k |d_{ijk}|^{\beta s} \right)^{1/\beta s}$$

Where $d_{ijk}$ is an error in a particular frequency i,j, and block k, $\beta$s is a pooling exponent having a typical value of 4. It is allowed that the routine of expression (7) provide a matrix of exponents $\beta$s since the pooling of errors may vary for different DCT coefficients.

The matrix $p_{ij}$ of expression (7) is the "perceptual error matrix" and is a simple measure of the visibility of artifacts within each of the frequency bands defined by the DCT basic functions. More particularly, the perceptual error matrix is a good indication of whether or not the human eye can perceive a dilution of the image that is being compressed. The perceptual error $p_{ij}$ matrix developed by segments 56, 58, 60 and, finally, segment 62 is applied to processing segment 64.

In processing segment 64, each element of the perceptual error matrix $p_{ij}$ is compared to a target error parameter $\Psi$, which specifies a global perceptual quality of the compressed image. This global quality is somewhat like the entries in the perceptual error matrix and again is a good indication of the amount of degradation that the compressed image may suffer without being perceived by the human eye. If all quantities or errors generated by segment 62 and entered into segment 64 are within a delta of $\Psi$, or if the errors of segment 62 are less than the target error parameter $\Psi$ and the corresponding quantization matrix entry is at a maximum (processing segment 56), the search is terminated and the current element of quantization matrix is outputted to comprise an element of the final quantization matrix 78. Otherwise, if the element of the perceptual error matrix is less than the target parameter $\Psi$, the corresponding entry (segment 56) of the quantization matrix is incremented. Conversely, if the element of the perceptual error matrix is greater than the target parameter $\Psi$, the corresponding entry (segment 56) of the quantization matrix is decremented. The incrementing and decrementing is accomplished by processing segment 66.

A bisection method, performed in segment 66, is typically used to determine whether to increment or decrement the initial matrix 35 entered into step 56. In the bisection method a range is established for $q_{ij}$ between lower and upper bounds, typically 1 and 255 respectively. The perceptual error matrix $p_{ij}$ is evaluated at the mid-point of the range. If $p_{ij}$ is greater than the target error parameter $\Psi$, then the lower bound is reset to the mid-point, otherwise the upper bound is reset to the mid-point. This procedure is repeated until the mid-point no longer changes. As a practical matter, since the quantization matrix entries $q_{ij}$ in the baseline JPEG standard are eight bit integers, the needed degree of accuracy is normally obtained in nine iterations from a starting range of 1–255 (initial entry into segment 56). The output of the program segment 66 is applied to the quantize segment 56 and then steps 56–66 are repeated, if necessary, for the remaining elements in the initial matrix. The processing segments shown in FIG. 3 yield a compressed image with a resulting bit rate; however, if a particular bit rate is desired for the image, then the processing segments shown in FIG. 4 and given in the below Table 5 are applicable.

TABLE 5

| Processing Segment | Nomenclature |
| --- | --- |
| 80 | Select desired bit rate |
| 82 | Set initial target perceptual error |
| 84 | Optimize quantization matrix (56, 58, 60, 62, 64 and 66) |
| 86 | Quantize |
| 88 | Entropy code |
| 90 | Decision box (Is the bit rate $\approx$ desired bit rate) |
| 92 | Adjust target perceptual error |

Figure 4:
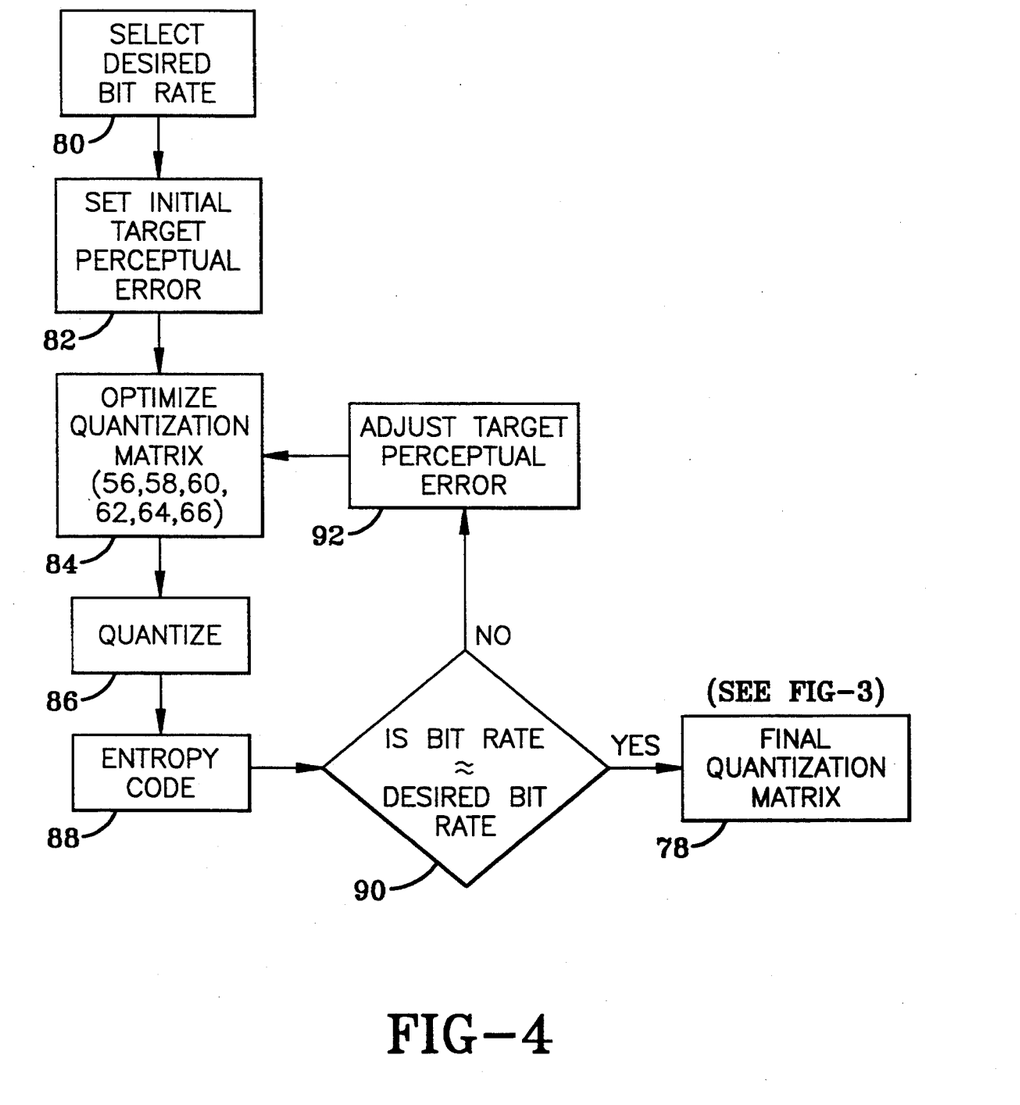
FIG. 4 schematically illustrates the steps involved, in another embodiment, with the formation of the quantization matrix optimizer of the present invention.

The processing segments 86–92, shown in FIG. 4 and given in Table 5, allow for the attainment of a particular bit rate and utilizes a second, higher-order optimization which if the first optimization results in a bit rate which is greater than desired, the value of the target perceptual error parameter $\Psi$ of segment 92 is incremented. Conversely, if a bit rate results which is lower than desired, the value of the target perceptual error parameter $\Psi$ of segment 92 is decremented.

The sequence of FIG. 4 starts with the selection (segment 80) of the desired bit rate followed by the setting (segment 82) of the initial target perceptual error. The output of segment 82, as well as the output of segment 92, is applied to segment 84 which comprises segments 56, 58, 60, 62, 64 and 66, all previously described with reference to FIG. 3 and all of which contribute to provide an optimized quantization matrix in a manner also described with reference to FIG. 3. The output of segment 84 is applied to the quantize segment 86 which operates in a similar manner as described for the quantize segment 38 of FIG. 2. The output of segment 86 is applied to the entropy code segment 88 which operates in a similar manner as described for the entropy code 40 of FIG. 2.

To accomplish the adjustment of the bit rate, the output processing segment 88 is applied to a decision segment 90 in which the actual bit rate is compared against the desired bit rate and, the result of such comparison, determines the described incrementing or decrementing of the target perceptual error parameter $\Psi$. After such incrementing or decrementing the processing steps 84–90 is repeated until the actual bit rate is equal to the desired bit rate, and the final quantization matrix 78 is created.

It should now be appreciated that the practice of the present invention provides for a quantization matrix 78 that yields minimum perceptual error for a given bit or a minimum bit rate for a given perceptual error. The present invention, as already discussed, provides for visual masking by luminance and contrast techniques as well as by error pooling. The luminance masking feature may be further described with reference to FIG. 5.

Figure 5:
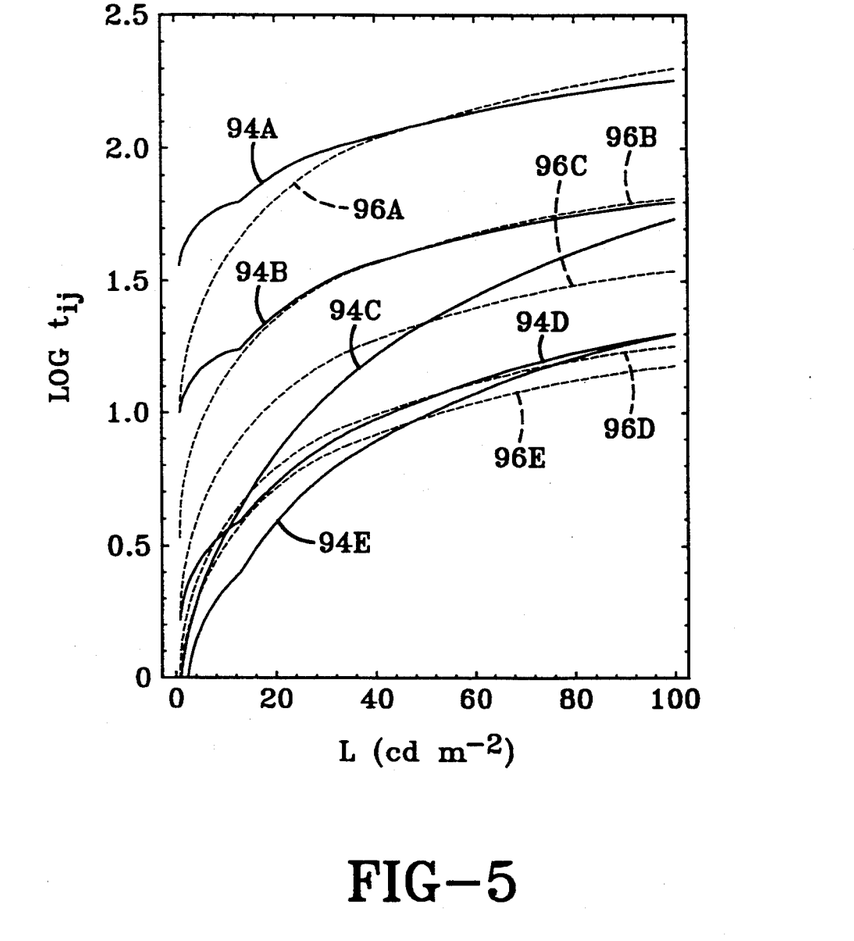
FIG. 5 illustrates a series of plots showing the variations of the luminance patterns of a digital image.

FIG. 5 has a Y axis given in the log function of $t_{ij}$ of expression (1) and a X axis given in display luminance L measured in cd/m². The quantity $t_{ij}$ of the block of data shown in FIG. 5 is based on a maximum display luminance L of 100 cd/m² and a grey scale (reference scale for use in black-and-white television, consisting of several defined levels of brightness with neutral color) resolution of eight (8) bits.

Two families of curves are shown in FIG. 5 with one being 94A, 94B, 94C, 94D and 94E (shown in solid representations), and the other being 96A, 96B, 96C, 96D and 96E (shown in phantom representations). The families 94A..94E, and 96A..96E are plots for the DCT coefficient frequencies given Table 6.

TABLE 6

| Plots | Frequency |
|---|---|
| 94A and 96A | 7, 7 |
| 94B and 96B | 0, 7 |
| 94C and 96C | 0, 0 |
| 94D and 96D | 0, 3 |
| 94E and 96E | 0, 1 |

Detection threshold ($t_{ij}$) for a luminance pattern typically depends upon mean luminance from the local image region. More particularly, the higher the background of the image being displayed, the higher, the luminance threshold. This is usually called "light adaptation" but it is called herein "luminance masking."

FIG. 5 illustrates this effect whereby higher background luminance yields higher luminance thresholds, wherein the solid plots 94A ... 94E indicate this interdependency. In particular, it is seen that the value of $t_{ij}$ for each of the plots 94A ... 94E increases with increasing values of luminance. The plots 94A ... 94E illustrate that as much 0.5 log units in $t_{ij}$ might be expected to occur within an image, due to variations in the mean luminance of a block. The present invention takes this variation into account, whereas known prior art techniques fail to consider this wide variation.

The effect of mean luminance upon DCT coefficients of the quantization matrix $q_{ij}$ is complex, involving both vertical and horizontal shifts of the contrast sensitivity function. The luminance-masked threshold may be determined by equation 8:

$$t_{ijk} = a_t w[i,j] L_0 c_{00k}/\overline{c_{00}}$$

where $c_{00k}$ is the DC coefficient of DCT for block k, $L_0$ is the mean luminance of the display, and $c_{00}$ is the DC coefficient corresponding to $L_0$ (1024 for an eight (8) bit image). The solution is as complete and accurate as the underlying formula, but may be rather expensive to compute. For example, in the "Mathematica" language, using a compiled function, and running on channelized equipment 14 (SUN SPARC 2) of FIG. 1, took about 1 second per block to compute this function. A second, simpler solution is to approximate the dependence of $t_{ij}$ upon $c_{00k}$ with the power function of the equation (2) previously given.

In practice, the initial calculation of $t_{ij}$ should be made assuming a selected displayed luminance $L_O$. The parameter $a_t$ has a typical value of 0.649. It should be noted, that luminance masking may be suppressed by setting $a_t$ equal to 0. More generally, $a_t$ controls the degree to which the masking of FIG. 4 occurs. It should be further noted that the power function given in expression 2 makes it easy to incorporate a non-unity display Gamma, by multiplying $a_t$ by the Gamma exponent having a typical value of 2.3.

The family of plots 96A ... 96E of FIG. 5 vary in accordance with the relationship of expression 2 and are relatively accurate for the parameters above about 10 cd/m². Except for very dark sections of an image, this range should be more than adequate for most image compressions. The discrepancy or inaccuracy of plots 96A ... 96E is also greatest at lowest frequency, especially at the DC term (0,0) $c_{00k}$. This discrepancy could be corrected by adopting a matrix of exponents, one for each frequency for the relationship given in expression (2).

It should now be appreciated that the practice of the present invention provides luminance masking (shown in FIG. 5 and performed in processing segment 52 of FIG. 3) which allows for an improved quality of the compressed image so that it may be more clearly reproduced and seen the human eye.

As previously discussed with reference to processing segment 54 of FIG. 3, the present invention also provides for contrast masking. Contrast masking refers to the reduction in the visibility of one image component by the presence of another. This masking is strongest when both components are of the same spatial frequency, orientation, and location within the digital image being compressed. Contrast masking is achieved in the present invention by expression (3) as previously described. The benefits of the contrast masking function is illustrated in FIG. 6.

Figure 6:
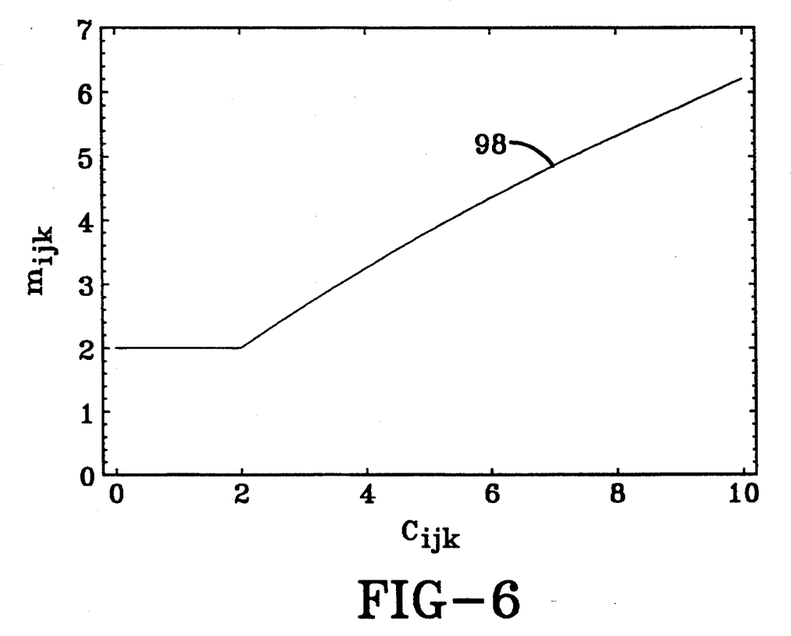
FIG. 6 is a plot of the contrast masking function involved in the practice of the present invention.

FIG. 6 has a Y axis given in the quantity $m_{ijk}$ (DCT mask) and a X axis given in the quantity $c_{ijk}$ (DCT coefficient) and illustrates a response plot 98 of the DCT mask $m_{ijk}$ as a function of the DCT coefficient $C_{ijk}$ for the parameter $w_{ij}=0.7$ and $t_{ijk}=2$. Because the effect of the DC coefficient $c_{00k}$ upon the luminance masking (see FIG. 5) has already been expressed, the plot 98 does not include an effect of the DC coefficient $c_{00k}$ and accomplishes such by setting the value of $w_{00}$ equal to 0. From FIG. 6 it may be seen that the DCT mask ($m_{ijk}$) linearly increases from $c_{ijk}$ quantities of between about 2 to 10. This DCT mask ($m_{ijk}$) generated by processing segment 54 adjusts each block for component contrast and is used in processing segment 60 to scale (divide) the quantization error with both functions of the DCT mask ensuring good digital compression, while still providing an image having good visual aspects.

It should be appreciated that the practice of the invention provides contrast masking so as to provide for a high quality visual representation of compressed digital images as compared to other prior art techniques.

Figure 7:
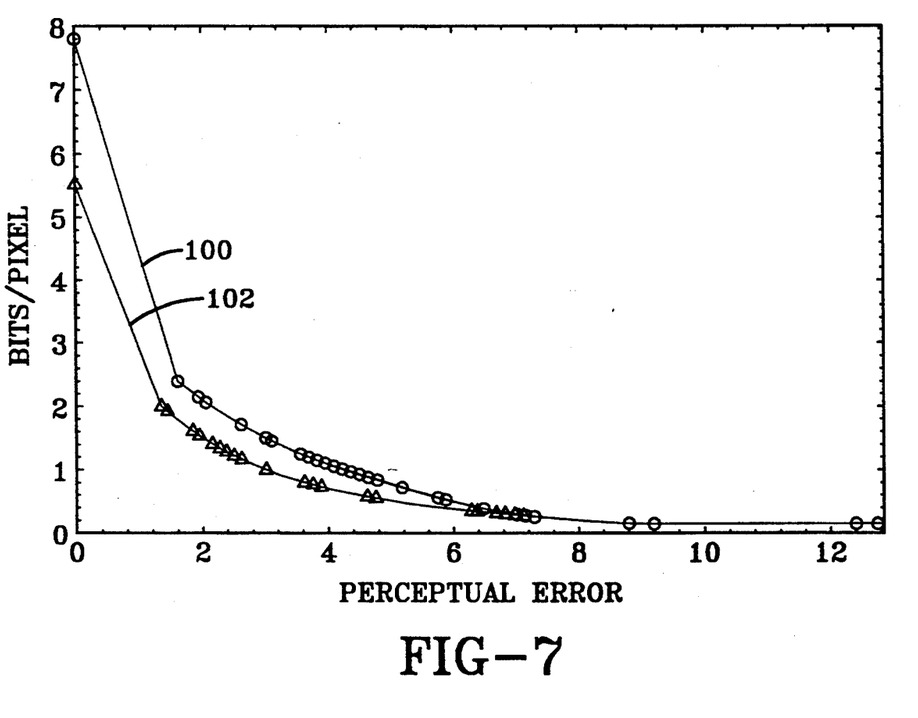
FIG. 7 illustrates two plots each of a different digital image and each showing the relationship between the perceptual error and the bit rate involved in image compression.

The overall operation of the present invention is essentially illustrated in FIG. 7. FIG. 7 has a Y axis given in bits/pixel of the digital image and a X axis given in perceptual error. FIG. 7 illustrates two plots 100 and 102 for two different images that were compressed and reconstituted in accordance with the hereinbefore described principles of the present invention. From FIG. 7 it is seen that the increasing bits/pixel rate causes a decrease in the perception error.

The previously given description described herein yields a desired quantization matrix $q_{ij}$ with a specified perceptual error $\Psi$. However, if desired one may have a quantization matrix $q_{ij}$ that uses a given bit rate $h_o$ with a minimum perceptual error $\Psi$. This can be done iteratively by noting that the bit rate is a decreasing function of the perceptual error $\Psi$, as shown in FIG. 7. In the practice of our present invention a second order interpolating polynomial fit to all previous estimated values of {h, $\Psi$} to estimate a next candidate $\Psi$, terminating when $|h-h_O| < \Delta h$, where $\Delta h$ is the desired accuracy in bit rate. On each iteration a complete estimation of is performed.

It should now be appreciated that the practice of the present invention provides a perceptual error that incorporates visual masking by luminance and contrast techniques, and error pooling to estimate the matrix that has a minimum perceptual error for a given bit rate, or minimal bit rate for a given perceptual error. All told the present invention provides a digital compression technique that is useful in the transmission and reproduction of images particularly those found in high definition television applications.

Further, although the invention has been described relative to a specific embodiment thereof, it is not so limited and many modifications and variations thereof now will be readily apparent for those skilled in the art in light of the above teachings.

What I claim is:

1. The method for transforming a block having an index k of pixels from an electronic image into a digital representation of said image comprising the steps of:
   (a) applying a Discrete Cosine Transform (DCT) to transform said block of pixels into digital signals represented by DCT transformation coefficients $C_{ijk}$;
   (b) selecting a DCT mask ($m_{ijk}$) for each block of pixels based on parameters comprising said DCT transformation coefficients $C_{ijk}$ and display and perceptual parameters;
   (c) selecting quantization matrix ($g_{ij}$) comprising the steps of:
      (i) selecting an initial value of $q_{ij}$ having a DCT coefficient $C_{ijk}$;
      (ii) quantizing each DCT coefficient $c_{ijk}$ in each block k to form quantized coefficient $U_{ijk}$;
      (iii) de-quantizing the quantized coefficients $u_{ijk}$ by multiplying them by $q_{ij}$ to form $q_{ij} u_{ijk}$;
      (iV) subtracting the de-quantized coefficient $q_{ij} u_{ijk}$ from $c_{ijk}$ to compute a quantization error $e_{ijk}$;
      (v) dividing $e_{ijk}$ by the DCT mask $m_{ijk}$ to obtain perceptual errors;
      (vi) pooling the perceptual errors of one frequency $ij$ over all blocks k to obtain an entry in a perceptual error matrix $p_{ij}$;
      (vii) repeating steps i-vi for each frequency $ij$;
      (viii) adjusting the values $q_{ij}$ up or down until each entry in the perceptual error matrix $p_{ij}$ is within a target range; and
      (ix) entropy coding said quantization matrix and the quantized DCT coefficients of said image.

2. The method of transforming an image according to claim 1 further comprising the steps:
   (a) transmitting entropy coded image to a user of said digital image;
   (b) decoding said entropy coded image;
   (c) decoding said quantization matrix to derive said DCT transformation coefficients; and
   (d) applying an inverse Discrete Cosine Transform to derive said block of pixels.

3. The method of transforming an image according to claim 2, wherein block mean luminance and component contrast are included in said display and perceptual parameters and are determined by the following expression:

$$t_{ijk} = t_{ij}(C_{00}/\overline{C_{00}})^{a_t}$$

where $a_t$ is a luminance-masking exponent having a value of about 0.65, $t_{ij}$ is the un-adjusted threshold of luminance, $C_{00}$ is an average of the DC terms of the DCT coefficients $C_{ijk}$ of the image, and $c_{00k}$, is the DC coefficient of block k.

4. The method of transforming an image according to claim 2, wherein said DCT mask is determined by the following expression:

$$m_{ijk} = \text{Max}\ [t_{ijk}, |C_{ijk}|^{W_{ij}} t_{ijk}^{1-w_{ij}}]$$

where $C_{ijk}$ is the DOT coefficient, $t_{ijk}$ is a corresponding block mean luminance adjusted threshold, and $w_{ij}$ is an exponent that lies between 0 and 1 and is about 0.7.

5. The method of transforming an image according to claim 2, wherein said pooling of perceptual errors is determined by the following expression:

$$p_{ij} = \left( \sum_k |d_{ijk}|^{\beta_s} \right)^{1/\beta_s}$$

6. The computer involved in converting a block having an index k of pixels from an electronic image into a digital representation of said image, said computer comprising:
   (a) means for applying a Discrete Cosine Transform (DCT) to transform said block of pixels into digital signals represented by DCT transformation coefficient ($c_{ijk}$);
   (b) means for selecting a DCT mask ($m_{ijk}$) for each block of pixels based on parameters comprising said DCT transformation coefficients $c_{ijk}$ and display and perceptual parameters;
   (c) means for selecting a quantization matrix ($q_{ij}$) comprising:
      (i) means for selecting an initial value of $q_{ij}$;
      (ii) means for quantizing the DCT coefficient $c_{ijk}$ in each block k to form quantized coefficient $u_{ijk}$;
      (iii) means for de-quantizing the quantized coefficients $U_{ijk}$ by multiplying them by $q_{ij}$ to form $q_{ij} u_{ijk}$;
      (iv) means for subtracting the de-quantized coefficient $q_{ij} u_{ijk}$ from $c_{ijk}$ to compute a quantization error $e_{ijk}$;
      (v) means for dividing $e_{ijk}$ by the DCT mask $m_{ijk}$ to obtain perceptual errors;
      (vi) means for pooling the perceptual errors of one frequency $ij$ over all blocks k to obtain an entry in a perceptual error matrix $p_{ij}$;
      (vii) means for adjusting the values $q_{ij}$ up or down until each entry in the perceptual error matrix $p_{ij}$ is within a target range: and
   (d) means for entropy coding said quantization matrix and the quantized DCT coefficients of said image.

7. The computer involved in converting an image according to claim 6 further comprising:
   (a) means for transmitting entropy coded image to a user of said digital image;
   (b) means for decoding said entropy coded image;
   (c) means for decoding said quantization matrix to derive said DCT transform coefficients; and
   (d) means for applying an inverse Discrete Cosine Transform to derive said block of pixels.

8. The computer involved in converting an image according to claim 6, wherein block mean luminance and component contrast are included in said display and perceptual parameters and are determined by the following expression embodied in the operation of said means for selecting a DCT mask:

$$t_{ijk} = t_{ij}(C_{ook}/\overline{C_{oo}})^{a_t}$$

where $a_t$ is a luminance-masking exponent having a value of about 0.65, $t_{ij}$ is the un-adjusted threshold of luminance, $C_{oo}$ is an average of the DC terms of the DCT coefficients $C_{ijk}$ of the image, and $C_{ook}$ is the DC coefficient of block k.

9. The computer network involved in converting an image according to claim 6, wherein said DCT mask is determined by the following expression embodied in said means for selecting a DCT mask:

$$m_{ijk} = \text{Max}[t_{ijk}, |C_{ijk}|^{w_{ij}} t_{ijk}^{1-w_{ij}}]$$

$m_{ijk}$, is the contrast-adjusted threshold, $c_{ijk}$ is the DCT coefficient, $t_{ijk}$ is the corresponding threshold of expression 2, and $w_{ij}$ is the exponent that lies between 0 and 1 and typically has a value of 0.7.

10. The computer involved in converting an image according to claim 6, wherein said pooling of perceptual errors is determined by the following expression embodied in said means for pooling:

$$p_{ij} = \left( \sum_k |d_{ijk}|^{\beta_s} \right)^{1/\beta_s}$$

Where $d_{ijk}$ is an error in a particular frequency i, j, and block k, $\beta_s$ is a pooling exponent having a typical value of 4.

* * * * *